(12) United States Patent
Hargrave et al.

(10) Patent No.: US 7,474,980 B2
(45) Date of Patent: Jan. 6, 2009

(54) AUTOMATED TOOL FOR MONITORING ARCHAEOLOGICAL SITES (ATMAS™)

(75) Inventors: Michael L. Hargrave, Urbana, IL (US); William D. Meyer, White Heath, IL (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 455 days.

(21) Appl. No.: 11/340,819

(22) Filed: Jan. 24, 2006

(65) Prior Publication Data

US 2007/0174103 A1    Jul. 26, 2007

(51) Int. Cl.
     *G06F 15/00*     (2006.01)
     *G06F 15/21*     (2006.01)

(52) U.S. Cl. ............... 702/127; 705/9; 705/28; 702/182; 702/184; 702/188

(58) Field of Classification Search ........... 702/85, 702/119, 127, 182–184, 188; 705/2, 6–10, 705/28

See application file for complete search history.

(56) References Cited

U.S. PATENT DOCUMENTS

| | | | |
|---|---|---|---|
| 4,937,743 A | 6/1990 | Rassman et al. | |
| 6,839,680 B1 * | 1/2005 | Liu et al. | 705/10 |
| 2003/0139983 A1 | 7/2003 | Spencer et al. | |
| 2004/0133347 A1 | 7/2004 | Britt | |

* cited by examiner

*Primary Examiner*—John H Le
(74) *Attorney, Agent, or Firm*—Earl H. Baugher, Jr.

(57) ABSTRACT

An automation tool for resource managers to effectively schedule on-site visits and manage information obtained thereby. An embodiment of the present invention, the Automated Tool for Monitoring Archaeological Sites (AT-MAS™), automates the process by which cultural resource (CR) managers on various installations prioritize and schedule CR sites for monitoring. Other applications for use by resource management include: environmental, safety, security, military, educational, emergency management, land use, fish and wildlife management, construction and maintenance of highways and waterways, mining, exploration, manufacturing, recreational management, urban restoration and the like. Embodiments of the present invention increase efficiency and reduce cost, while accurately and timely preserving and integrating information. Embodiments of the present invention are useful for post-processing as well as scheduling, analysis, and pro-active direction of ongoing monitoring.

23 Claims, 9 Drawing Sheets

AUTOMATED TOOL FOR MONITORING ARCHAEOLOGICAL SITES (ATMAS™)

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Bea Shahin at 217 373-7234 or Phillip Stewart at 601 634-4113.

BACKGROUND

Federal law requires that federal installations manage historic properties, including archaeological sites. The Guidelines for Section 110 of the National Historic Preservation Act (NHPA) of 1966, as amended (36 CFR § 800) require federal agencies to ensure that properties eligible for the National Register are not ". . . inadvertently . . . demolished, substantially altered, or allowed to deteriorate significantly." The Native American Graves Protection and Repatriation Act (NAGPRA) of 1990 requires consultation prior to intentional excavations and subsequent to inadvertent discoveries of human remains. Executive Order 13007 requires federal agencies to avoid adverse impacts to Native American sacred sites. The Archaeological Resources Protection Act (ARPA) of 1979 imposes criminal and civil penalties for un-permitted excavation or damage to archaeological sites. Compliance with each of these laws and a proactive approach to resource management creates the need for systematic monitoring of archaeological sites. Further, complex investigations are mandated from related legislation, such as Environmental Site Assessments (ESA) and Environmental Impact Statements (EIS), as well as from various state, local, and tribal requirements. Compliance with these laws often requires one to inventory, manage, and conserve both natural and cultural resources.

One example of an installation requiring systematic management of archaeological sites, both known and unknown, is the Fort Irwin (California) installation managed by the U.S. Army. Archaeological sites are scattered across the Fort Irwin landscape and are not recognizable by non-specialists. Cultural resource (CR) managers at Fort Irwin have documented more than a thousand archaeological sites. These sites must be protected until their National Register eligibility is determined. Eligible sites must be preserved (managed) as the installation performs its military training mission. As a result of the Army's mission, the sites may be vulnerable to damage from a number of sources, including vehicle traffic, erosion, excavation, and infrastructure development. Additionally, some of these sites may be susceptible to vandalism and looting.

Monitoring the condition of such a large number of archaeological sites is difficult. Further, ongoing inventories continuously increase the number of archaeological sites. Changes in military training alter the risk of adverse impacts to sites. The competing needs of environmental sustainability and efficient land use often require implementation of complex, integrated programs to reconcile the two. Without a systematic program, it is likely that monitoring will focus on a few high-profile sites, such as those known to include relatively dense surface scatters of artifacts. Such sites are, of course, very important, but it is also necessary to monitor the condition of more typical sites.

Thus, there exists a need for a method and system to prioritize, schedule, manage inventory, and maintain accurate and consistent records. Conventional methods for doing this are expensive and inefficient, in large part due to the manual handling involved. An embodiment of the present invention provides a solution to the problem posed by labor intensive maintenance, evaluation, and updating of information about archaeological site condition. The Automated Tool for Monitoring Archaeological Sites (ATMAS™) is an automated tool designed to help CR managers monitor sites in a responsible, effective manner by integrating information to facilitate prioritizing, scheduling, and managing a CR program at an installation.

SUMMARY OF THE INVENTION

A method for prioritizing and scheduling monitoring visits to sites comprises: defining impact categories and measures of intensity for impact categories; establishing guidance for assigning measures of intensity; defining priority levels; calculating first and second estimates of risk, first estimates of risk established via prediction and second estimates established via observation; assigning the estimates of risk; implementing a database program to establish records and to process impacts, measures, and estimates in order to assign a priority level; assigning sites of a given priority to a unique group; installing the database program on computers; scheduling a sample from each group for visits, the sample defined by randomly selecting a pre-defined percentage unique to each group; accomplishing the sampling by employing a pre-specified algorithm and providing the sample as a list of sites to be visited by site monitors during the pre-specified interval. The method may use software comprising commercial-off-the-shelf (COTS) programs.

The method further comprises facilitating management of the information obtained from site visits, in particular visits to cultural resource sites. Further, the method incorporates a capability to override risk estimates including prediction risk estimates.

The method also provides a capability to edit records, to incorporate photos of the sites and to update records from linked software programs, in particular a cultural resource database that also contains a photo database.

Applications of the method further include environmental, safety, security, military, educational, emergency management, land use, fish and wildlife management, construction and maintenance of highways and waterways, mining, exploration, manufacturing, recreational management, and urban restoration. ATMAS™ may be used for post-processing as well as scheduling, analysis, and pro-active direction of ongoing monitoring.

DETAILED DESCRIPTION

Figure 1:
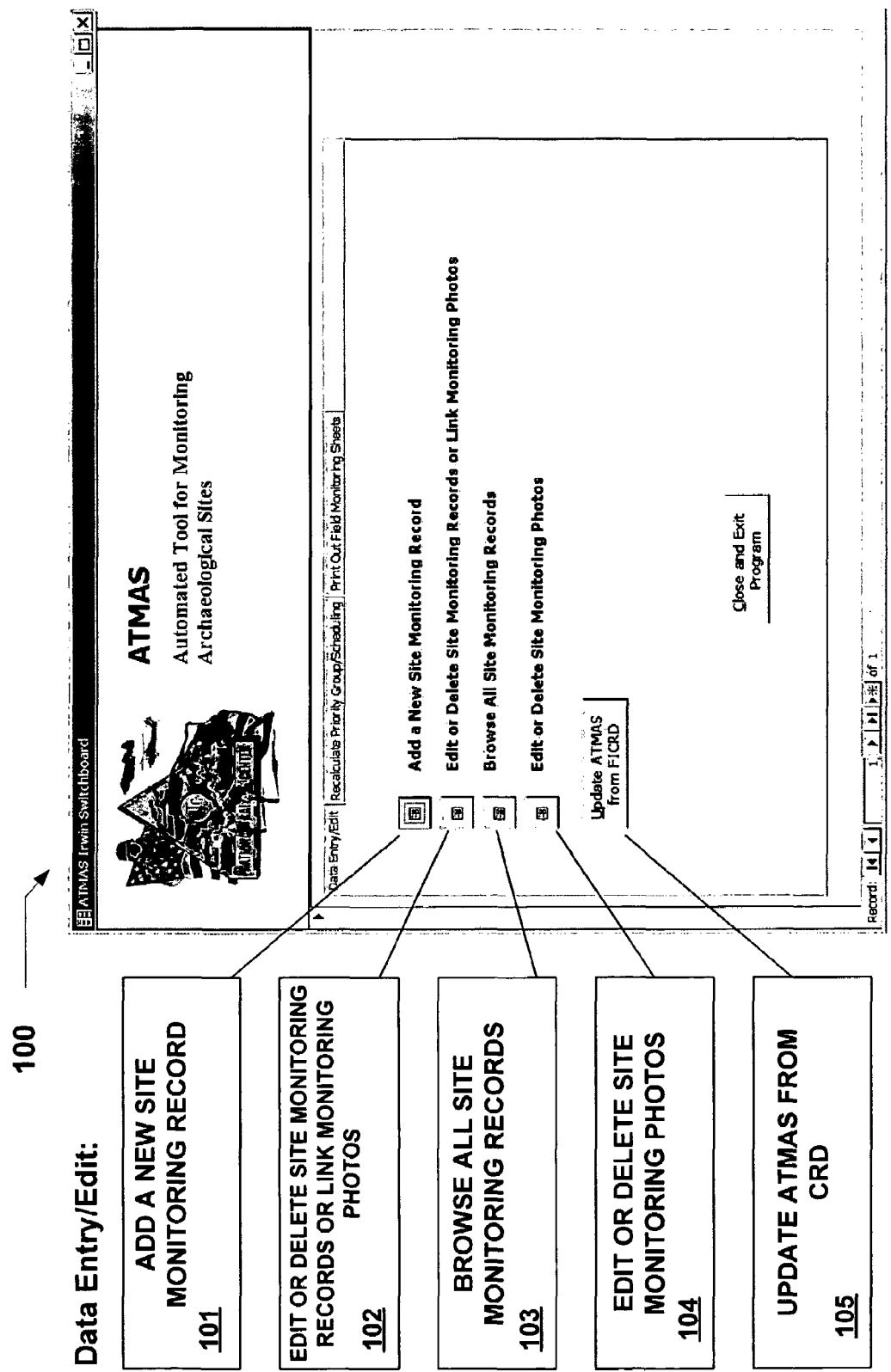
FIG. 1 depicts a screen print and expanded illustration from a first tab of an initial screen on a display used with a computer when software incorporated in an embodiment of the present invention is initiated.

An embodiment of the present invention, the Automated Tool For Monitoring Archaeological Sites (ATMAS™), was developed on the MICROSOFT ACCESS® 2000 database platform with a graphical user interface (GUI). In select embodiments of the present invention, ATMAS™ version 2.0 allows cultural resource (CR) managers on various installations to systematically prioritize and schedule sites for monitoring and to manage information resulting from periodic monitoring visits.

In select embodiments of the present invention, a method for prioritizing and scheduling monitoring visits to sites to obtain information comprises: defining impact categories for the sites; defining measures of intensity for each impact category; establishing guidance for assigning the measures of intensity; defining priority levels for the visits; calculating estimates of risk for each site, such that one or more first estimates of risk are established via prediction and one or more second estimates of risk are established via observation; assigning estimates of risk to each site; implementing a database program in software to establish records and manipulate one or more of the impacts, measures, and estimates to assign a priority level to each site, assigning each site of a given priority to a unique group; installing the database program on one or more computers; scheduling a sample from each unique group for visits over a pre-specified interval, such that a sample is defined by randomly selecting a pre-defined percentage, the percentage unique to each group, and such that sampling is accomplished by employing a pre-specified algorithm installed on one or more computers; and providing the sample as a list of sites to be visited by one or more site monitors during the pre-specified interval.

In select embodiments of the present invention, the method further comprises facilitating management of information obtained from the site visits. In select embodiments of the present invention, the method is applied to cultural resource sites.

In select embodiments of the present invention, the method uses software comprising one or more commercial-off-the-shelf programs.

In select embodiments of the present invention, the method incorporates a capability to override one or more risk estimates for one or more sites. In select embodiments of the present invention, the method incorporates a capability to override a prediction risk estimate for one or more sites.

In select embodiments of the present invention, the method provides a capability to edit records. In select embodiments of the present invention, the method provides a capability to incorporate photos of the sites. In select embodiments of the present invention, the method provides a capability to update records from one or more linked software programs. In select embodiments of the present invention, the linked software program is a cultural resource database. In select embodiments of the present invention, the linked software program comprises a photo database.

In select embodiments of the present invention, a method for monitoring cultural resource (CR) sites to obtain information comprises: defining impact categories for the CR sites; defining measures of intensity for each impact category; establishing guidance for assigning the measures of intensity; defining priority levels for the CR sites; calculating estimates of risk for each CR site, such that one or more first estimates of risk are established via prediction and one or more second estimates of risk are established via observation; assigning estimates of risk to each CR site; implementing a CR database in software to establish records and manipulate one or more of the impacts, measures, and estimates to assign one priority level to each CR site, each CR site of a given priority assigned to a unique group; and installing the database on one or more computers.

In select embodiments of the present invention, the method schedules CR monitoring visits by sampling from each group, such that the sampling is defined by randomly selecting a pre-defined percentage, the percentage unique to each group, and such that the sampling is defined by employing a pre-specified algorithm installed on one or more computers.

In select embodiments of the present invention, the method provides the sample as a list of CR sites to be visited by one or more CR site monitors during the pre-specified interval. In select embodiments of the present invention, the method facilitates management of information obtained from CR site visits.

In select embodiments of the present invention, the software program is one or more commercial-off-the-shelf programs. In select embodiments of the present invention, the method incorporates a capability to override one or more estimates of risk for one or more CR sites.

In select embodiments of the present invention, the method has a capability to override the prediction risk estimate for one or more CR sites. In select embodiments of the present invention, the method has a capability to edit CR records. In select embodiments of the present invention, the method has a capability to update the CR records from one or more linked software programs.

In select embodiments of the present invention, the method provides a capability to incorporate photos of the CR sites. In select embodiments of the present invention, the linked software program comprises a CR database. In select embodiments of the present invention, the linked software program comprises a photo database.

Other applications of embodiments of the present invention for resource management include these types of resources: environmental, safety, security, military, educational, emergency management, land use, fish and wildlife management, construction and maintenance of highways and waterways, mining, exploration, manufacturing, recreational management, urban restoration and the like. Embodiments of the present invention increase efficiency and reduce cost, while accurately and timely preserving and integrating information. Embodiments of the present invention are useful for post-processing as well as scheduling, analysis, and pro-active direction of ongoing monitoring.

In select embodiments of the present invention, ATMAS™ 2.0 prioritizes CR sites based on three management factors: "Information Potential," $I_p$, "Observed Risk," $O_R$, of future adverse impacts and "Predicted Risk," $P_R$, of future adverse impacts.

Information Potential is the degree to which a site has the potential to provide "information important in pre-history or history." This may be related to Criterion D for evaluating eligibility of a prehistoric site for nomination to the National Register of Historic Places. 36 CFR 60.

As an example, the strategy for determining the Information Potential of each site on Fort Irwin is based on one specified in the Integrated Cultural Resources Management Plan (ICRMP) of Fort Irwin. ICRMP, Fort Irwin DPW, Fort Irwin, Calif., August 2001. For use with the ICRMP, ATMAS™ 2.0 calculates Observed Risk using a group of impact types identified in the ICRMP. ATMAS™ 2.0 incorporates specific components derived from the ICRMP, such as Information Potential and Observed Risk, because these components are most appropriate to manage the types of archaeological resources and potential impacts thereto that are present at an installation such as Fort Irwin.

In one example, archaeological site data reside in a Cultural Resources Database (CRD) of the installation, such as the Fort Irwin Cultural Assessment Resources Database (FICARD). The CRD aids CR managers in managing basic information about archaeological sites and is used routinely by ATMAS™ 2.0 without the necessity to modify the CRD. That is, changes made in ATMAS™ 2.0 do not alter data in the CRD. When new sites are discovered or site data other than monitoring records are updated, changes are made to the CRD, but not via ATMAS™. Information Potential may be classified in a variety of ways. One such example, as used by the Fort Irwin CRD, is provided below.

Fort Irwin CR sites with "High" Information Potential exhibit multiple, and generally long-term, occupation by one or more cultures of interest and have the potential to yield an absolute date that the culture or cultural item existed in history. In many cases, CR sites have complex deposits, including vertical stratification or horizontal patterning. Additionally, any CR site with a strong potential for human remains is categorized as High Information Potential. Fort Irwin DPW 2001:91.

"Medium" Information Potential CR sites contain intact cultural material that is relevant to one or more important research questions. The medium potential CR sites are not as large or complex as those assigned to the high potential group, but the medium potential CR sites will often include intact features such as hearths, pits, or structural remains. Fort Irwin DPW 2001:92.

"Low" Information Potential CR sites are surface or shallow CR sites that are unlikely to contain datable material. These CR sites are typically small, exhibit a narrow range and low frequency of artifacts, and do not include cultural features. Fort Irwin DPW 2001:92.

An embodiment of the present invention, such as ATMAS™ 2.0, incorporates a system for rating CR sites in terms of their Information Potential. This embodiment may incorporate a rating system that is already in use, such as that of Fort Irwin. For example, the Fort Irwin rating system assigns 0, 1, 2, or 3 points to a site for each of six variables: NRHP eligibility, site type, site age, integrity, subsurface deposits, and area. An example of this rating scheme is shown in Table 1. Points are assigned using data available in the Fort Irwin Cultural Assessment Resource Database (FICARD). Information Potential is calculated by totaling the points for each of the six variables. Information Potential of a CR site may range from a minimum of zero (for a site known to exist, but for which essentially no data are available) to a maximum of 18 (for a site that gets three points for each of the above six characteristics).

TABLE 1

Criteria used to score CR sites by information potential. Fort Irwin DPW 2001: 92.

| CHARACTERISTIC | POINT VALUE | | | |
|---|---|---|---|---|
| | 0 | 1 | 2 | 3 |
| NRHP Eligibility | Not Eligible | Potentially Eligible | Eligible | Listed on NRHP |
| Site Type | No Data | C, CNP, LRS, LS, SC, TP, CNH, R, WSS | CS, FH, FPS, HUNTS, LQ, PS, MILS, MS, RS | HS, RAS, RSS, VS, HCS, HSS, RDS, RES |
| Site Age | No Data | Prehistoric, but period unknown | — | Any Site Assigned to a Particular Period |
| Integrity | No Data | >80% Disturbed | 30-80% Disturbed | <30% Disturbed |
| Subsurface Deposits | No Data | Surface Only | — | Subsurface Deposits |

TABLE 1-continued

Criteria used to score CR sites by information potential. Fort Irwin DPW 2001: 92.

POINT VALUE

| CHARACTERISTIC | 0 | 1 | 2 | 3 |
|---|---|---|---|---|
| Area | No Data | <120 m$^2$ | 120 m$^2$-44,500 m$^2$ | >44,500 m$^2$ |

Notes:
C = Clearing, CNP = Cairn (prehistoric), LRS = Lithic Reduction Site, LS = Lithic Scatter, (SIC) = stone circle, TP = trail, CNH = Cairn (historic), R = road, WSS = Water storage site, CS = Camp Site, FH = Fire Hearth, FPS = Food Processing Site, HUNTS = Hunting site, LQ = Lithic Quarry, PS = Pottery scatter, MILS = Military site, MS = Mining site, RS = Ranch Site, HS = Habitation site, RAS = Rock art site, RSS = Rock shelter, VS = Village site, HCS = Historic campsite, HSS = Homesteading site, RDS = Refuse disposal site, RES = Residential site.

Established risk measures, such as Observed and Predicted Risk of future adverse impacts, are important for managing cultural resources. In select embodiments of the present invention, these two types of risk are considered by ATMAS™ 2.0. The Observed Risk measure assumes that evidence of past adverse impacts is a good predictor of the risk of similar impacts in the future. Observed Risk is calculated using information gathered during monitoring visits. For example, if a particular CR site has sustained damage from numerous fighting positions and tank tracks, it is assumed that similar damage may occur in the future.

Note that the assumption that past impacts indicate a likelihood that similar impacts will occur in the future is what makes observations about past impacts important.

In select embodiments of the present invention, the measure of Predicted Risk is based on information about planned changes in training, infrastructure development, or other activities that may impact site condition. For example, the Fort Irwin CR managers may be informed that over the next few years, a particular management area will be used more intensively for training, and that several new tank trails will be constructed there. It is logical to "predict" (assume) that the CR sites in that training area are at a heightened risk of adverse impacts, and should therefore be monitored more frequently. In select embodiments of the present invention, a Predicted Risk measure is set by the ATMAS™ programmers using information from Table 4-13 of the ICRMP. ICRMP (August 2001). In select embodiments of the present invention, this measure may be changed upon request from a user, such as a CR manager.

In select embodiments of the present invention, ATMAS™ 2.0 provides a "Predicted Risk Override" capability by which the user ensures that a specific CR site will be allocated a high prioritization, regardless of its numerical score. This override capability may be used in the case of particularly important or threatened CR sites that need to be monitored more frequently than a schedule of CR site visits ensuing through normal implementation of ATMAS™.

When select embodiments of the present invention, such as ATMAS™ 2.0, are first used at an installation, no records of previous CR site monitoring may be available. Observed Risk is not calculated until monitoring records are available. Predicted Risk is based on generalizations about the relative difference in the likelihood of adverse impacts in the Management Areas defined by the CR Manager. Since the Management Areas may be large, measures of Predicted Risk may be good estimates for some CR sites and poor estimates for others. The Predicted Risk Override capability allows the user to manually set the Predicted Risk for individual CR sites as needed in situations where risk of adverse impacts is variable within a Management Area.

Use of ATMAS™ assumes that CR monitoring visits are brief. This permits increasing the number of CR sites that may be visited during a monitoring period, e.g. one year. In select embodiments of the present invention, immediately following each visit a CR manager inputs into ATMAS™ information about the visited CR site and relative intensity of adverse impacts, coded as none, low, medium, or high. See Table 2.

TABLE 2

List of Adverse Impacts to be Recorded During CR Monitoring Visits.

| OCCURRENCE | NONE (0), LOW (1), MEDIUM (2), OR HIGH (3) | ACTIVITY | PRESENT (P) OR ABSENT(A) |
|---|---|---|---|
| Tank Tracks | | Vehicle Parking | |
| Wheel Ruts | | Bivouacking | |
| Fighting Positions | | Littering | |
| Latrines | | Oil Clean-up | |
| Tank Traps | | Building Construction | |
| Other Mechanized Excavations | | Road Construction | |
| Artillery Impacts | | Utility Construction | |
| Small Arms Impacts | | Fill Borrow Construction | |
| Potential for Vandalism | | Check-dam Construction | |
| Looter Holes | | Re-vegetation | |
| Target Construction | | Other Ground Disturbance-Facilities | |
| Trail Construction | | Other Ground Disturbance-Erosion | |
| Horseback Riding or Hiking | | | |
| Rock Painting | | | |

In select embodiments of the present invention, ATMAS™ 2.0 displays monitoring records for each CR site in chronological order. A user may inspect these records and detect increases in the occurrence of adverse impacts. In select embodiments of the present invention, ATMAS™ 2.0 uses data on observed impacts to calculate a revised value for Observed Risk. This calculation occurs whenever a user enters new data into a CR monitoring record as described below.

In select embodiments of the present invention, ATMAS™ 2.0 allows a user to decide how many CR monitoring visits will be conducted during a pre-specified interval, e.g., annually. A CR manager may also input criteria to ATMAS™ to decide how to distribute visits among the high, medium, and low priority groups. In select embodiments of the present invention, ATMAS™ 2.0 uses these criteria to randomly select CR sites for monitoring from each group. A list of the selected CR sites may be printed. An algorithm may use a built in commercially available Random Number Generator to get a list of random numbers. The algorithm may provide a start number to the random number generator, the generator producing random numbers thereafter. This list may serve as an assignment or check sheet for personnel tasked with conducting CR monitoring visits.

EXAMPLE

Refer to FIG. 1. In select embodiments of the present invention, ATMAS™ 2.0 is provided on a CD, allowing CR managers to load the program onto computers that run the MICROSOFT OFFICE® 2000 suite incorporating the relational database software, ACCESS® 2000. FIG. 1 depicts functions of the ATMAS™ Switchboard screen 100, provided as a "screen print" for illustrative purposes only. This Switchboard screen 100 is made available through clicking on the ATMAS™ 2.0 icon visible on the "Start\Programs" menu of WINDOWS® for those computers running WINDOWS®. The user may select buttons on the Switchboard screen 100 to: Add a New Site Monitoring Record 101; Edit or Delete Site Monitoring Records or Link Monitoring Records 102; Browse All Site Monitoring Records 103; or to Edit or Delete Site Monitoring Photos 104. In addition, ATMAS™ 2.0 may be updated as discussed below by using the Update ATMAS™ from CRD button 105.

In select embodiments of the present invention, ATMAS™ 2.0 uses a copy of the CRD, not the actual CRD, e.g., a copy of the Fort Irwin CRD. When new CR sites are discovered, they are entered directly into the actual CRD. Before a monitoring record is created in ATMAS™ 2.0 for a new CR site, the copy of the CRD used by ATMAS™ 2.0 is updated. In select embodiments of the present invention, this is accomplished through the following steps.

Open the CRD from a suitable relational database, such as ACCESS®. Highlight the "Cultural_Resources" Table. Select the "Export" command from the ACCESS™ File menu and export the "Cultural Resources" Table To ATMAS™ 2.0. Using the Dialog Box provided, navigate to the ATMAS™ 2.0 Directory. Select the "ATMASinstallation" data file, e.g., for Fort Irwin it would be the "ATMASIrwin" data file, and click the "Save" button to save the exported Cultural Resources table to the ATMASinstallation data file in the ATMAS™ 2.0 directory. A message box opens indicating that the data file will be exported to "Cultural_Resources" in ATMASinstallation.mdb. Click the "OK" button. A message box asks if you want to replace the existing "Cultural_Resources" file. Select the "Yes" button to replace the existing file. Once this is accomplished click the Update ATMAS from the CRD button 105 on the Switchboard screen 100. Monitoring records for CR sites that are not new additions to the CRD may be created without using the Update ATMAS from CRD button 105.

Figure 2:
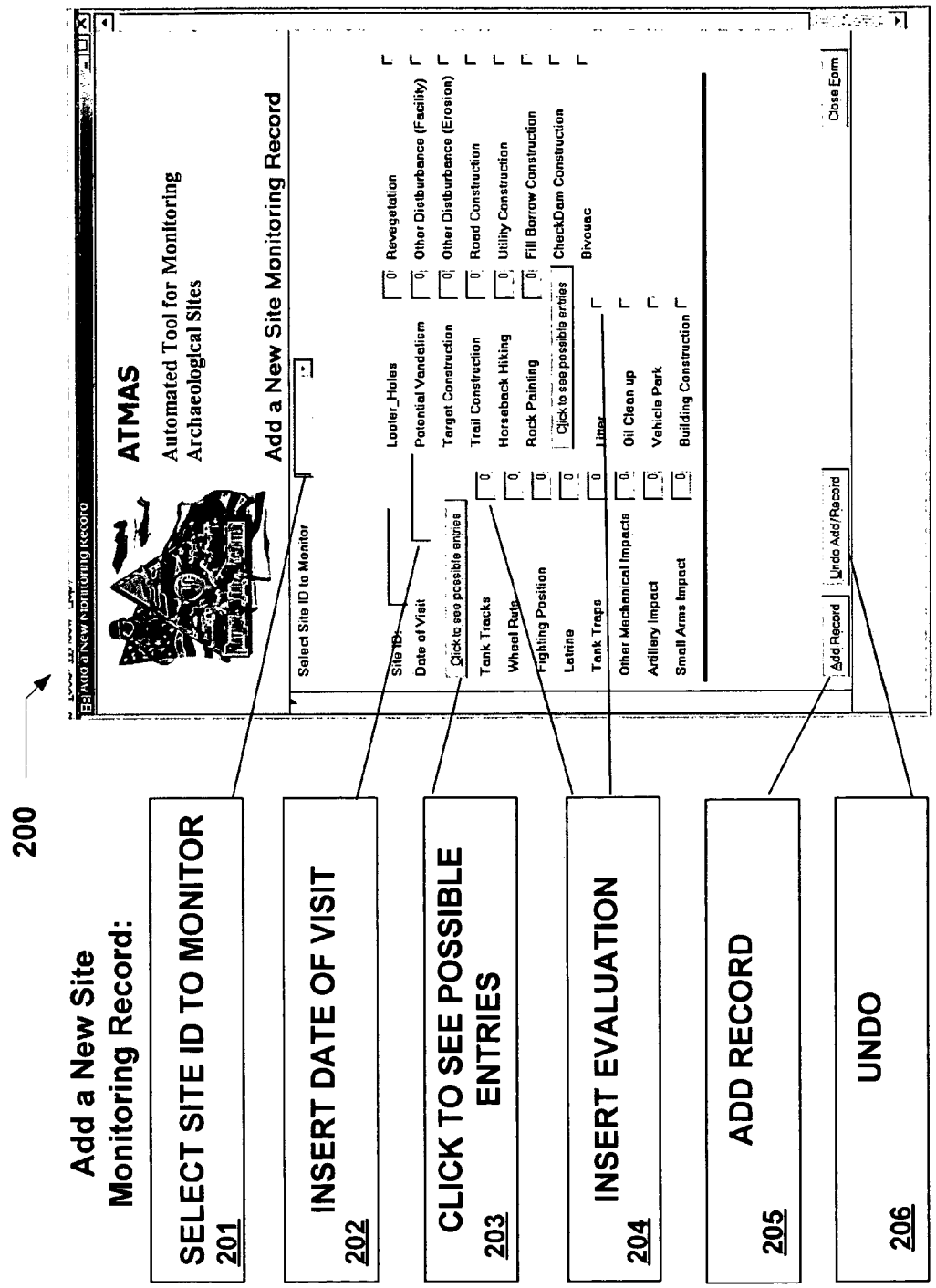
FIG. 2 depicts a screen print and expanded illustration of an available screen on a display used with a computer when software incorporated in an embodiment of the present invention is employed to add a new record.

Refer to FIG. 2. In select embodiments of the present invention, clicking the Add a New Site Monitoring Record 101 button on the ATMAS™ Switchboard screen 100 opens the data entry screen "Add a New Site Monitoring Record" screen 200, shown as a screen print in FIG. 2 for illustration purposes only. This Add a New Site Monitoring Record screen 200 contains "identification" fields for "Select Site ID to Monitor" 201 and "Insert Date of Visit" 202 and the collection of boxes for inserting "impact measures" represented by "Insert Evaluation" 204 in FIG. 2. Into applicable boxes, an "impact" (measure or evaluation) is inserted, e.g., "0" for "none", "1" for "low", etc. A topic field is associated with each of the boxes, such as those fields displayed in Table 2, such that the second and fourth columns of Table 2 are provided as the "fillable" impact boxes adjacent each of the applicable topics in Columns 1 and 3 of Table 2. Click on the Drop Down Arrow in the "Select Site ID to Monitor" box 201 on the Add a New Site Monitoring Record screen 200 and select a CR site from the Drop Down list for which you want to add a monitoring record. Fill in the impact boxes (Insert Evaluation 204) based on observations made during the CR monitoring visit. To complete a record click on the Add Record button 205. To not enter a change, click the Undo button 206.

In select embodiments of the present invention, an impact entry of low (1), medium (2), or high (3) refers to the degree to which the applicable impact affects the CR site. For example, one isolated fighting position at a CR site may be recorded as an impact level of 1 (low). A large number of fighting positions may be recorded as an impact level of 3 (high). Operational definitions and possible input values for each impact may be viewed by clicking on the Click to See Possible Entries button 203.

In select embodiments of the present invention, CR managers familiar with the nature and condition of the archeological resources of the installation edit the operational definitions provided in ATMAS™. CR managers employing ATMAS™ specify appropriate thresholds for low, moderate, and high levels of impact, and for Presence (P) vs. Absence (A). The threshold for treating an impact as Present preferably should be reasonably high in the general case. For example, if an impact is recorded as Present based on minimal activity, most impacts would be recorded as Present at most sites all the time. Failure to consistently use these thresholds reduces the ability of a CR manager to detect change in the intensity of impacts, thus defeating the purpose of systematic site monitoring.

In select embodiments of the present invention, for a CR manager at a specific installation to revise the operational definitions within ATMAS™, open the WORD™ file on the ATMAS™ CD and make the desired changes. E-mail the changed WORD® document to a system administrator who processes the changes and returns a new compiled Help file to the user. The user, typically a CR manager, copies the compiled Help file into the ATMAS™ program directory.

Figure 3:
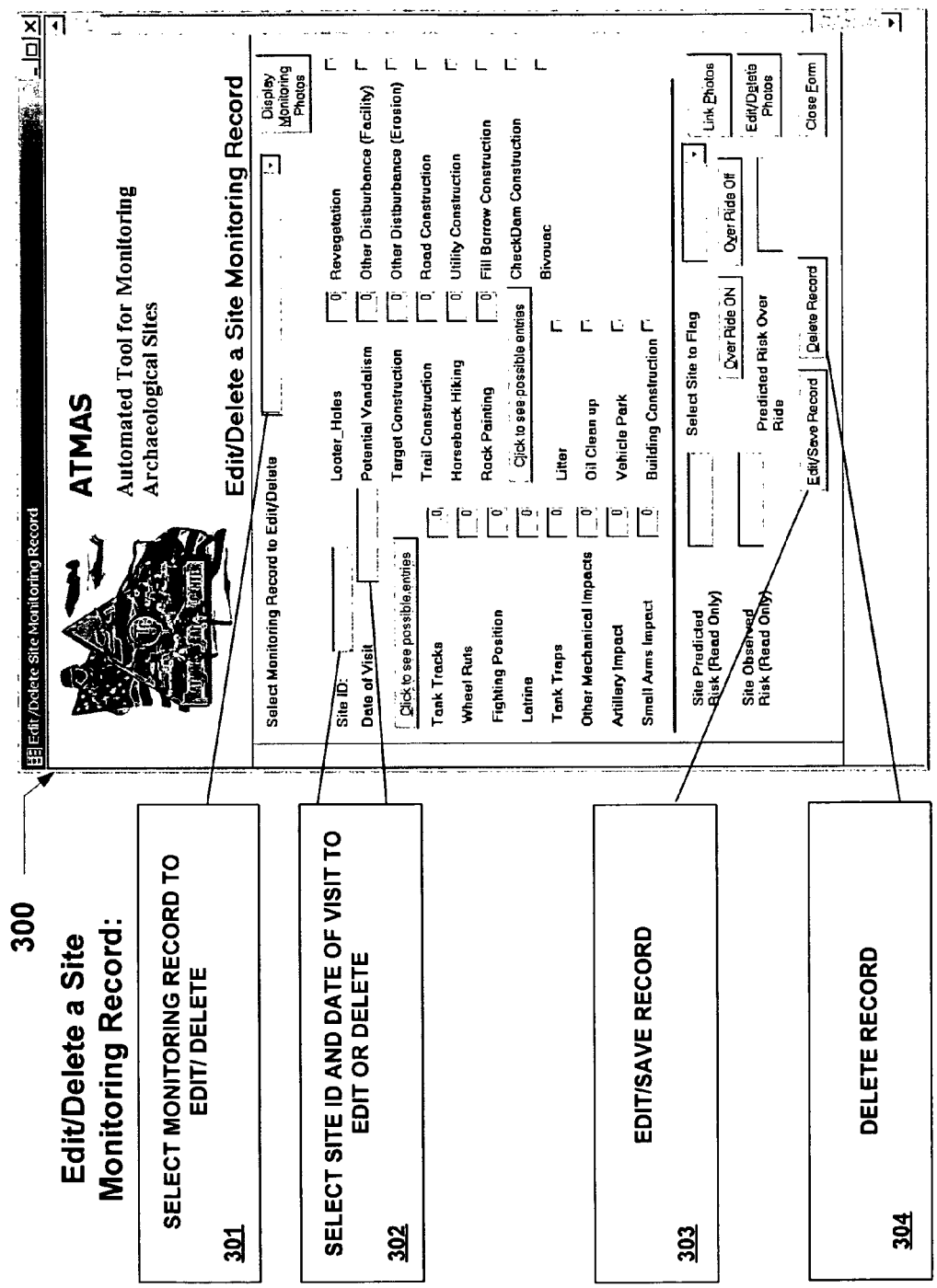
FIG. 3 depicts a screen print and expanded illustration of an available screen on a display used with a computer when software incorporated in an embodiment of the present invention is employed to edit or delete an existing record.

Refer to FIG. 3. In select embodiments of the present invention, to edit or delete monitoring information, click on the Edit or Delete Site Monitoring Records or Link Monitoring Photos button 102 in the ATMAS™ Switchboard screen 100. This opens the Edit/Delete a Site Monitoring Record (data edit) screen 300, shown as a screen print for illustration purposes only. Some options in using this data edit screen 300 are: Select Monitoring Record to Edit/Delete 301; Select Site ID and Date of Visit to Edit or Delete 302; Edit/Save Record 303 (data within the record) and Delete Record 304.

In the Select Monitoring Record to Edit/Delete box 301, click on the "Drop Down" arrow and Select the Site ID and Date of Visit 302 to modify or delete. Once selected the information from that CR site visit appears in the data entry fields (impact boxes). Edit any of these fields as necessary. Once completed, click the Edit/Save Record button 303 to save the new information. To permanently delete this record, click the Delete Record button 304.

Figure 4:
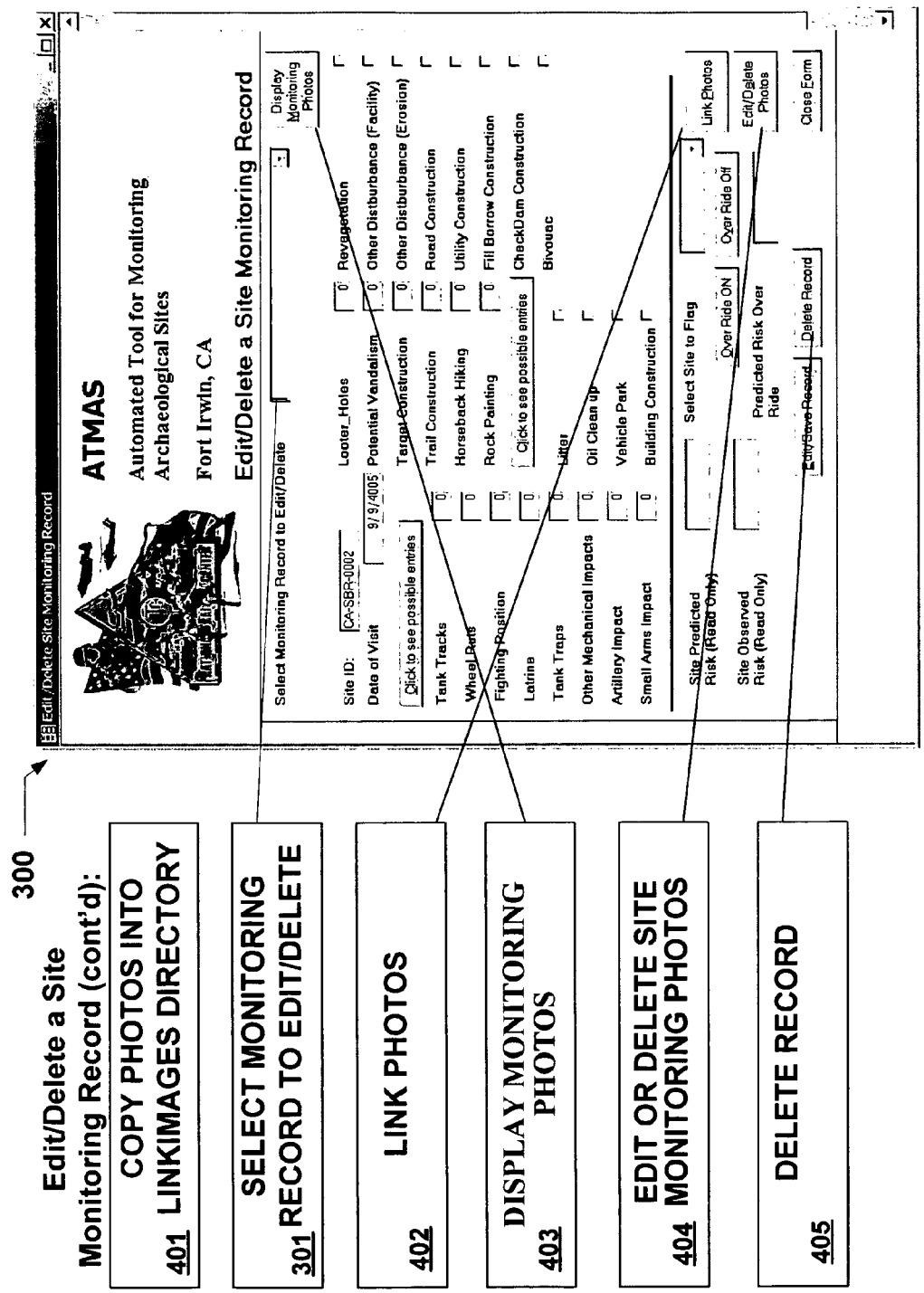
FIG. 4 depicts the screen print of FIG. 3, particularly expanding the photo editing capability of an embodiment of the present invention.

Refer to FIG. 4. In select embodiments of the present invention, the Edit/Delete a Site Monitoring Record (data edit) screen 300, depicted as a screen print in FIG. 4 for illustration only, is used to associate digital photos taken during a CR monitoring visit with a monitoring record. In the Select Monitoring Record to Edit/Delete box 301, click on the "Drop Down" arrow and select the monitoring record with which you wish to associate photos. Next, copy into the LinkImages Directory 401 in ATMAS™ 2.0 Directory, the desired digital photos for this CR site. Once these photos are copied into the LinkImages Directory, click on the Link Photos button 402 on the data edit screen 300. This moves the photos from the LinkImages Directory to the MonImages folder and stores a path to these photos that will be associated with this monitoring record. To view CR site photos, click on the Display Monitoring Photos button 403 to open the Monitoring Photo Viewer Screen (not shown separately). To view photos click on the "Drop Down" arrow and select a photo to view. Each viewer has a complete list of all the photos available for that CR site. To delete an entire record, click on the Delete Record button 405. To delete, edit or dissociate a photo with a CR site click on the Edit/Delete Site Monitoring Photos button 404 which opens the Edit or Delete Monitoring Photos screen 500, depicted as a screen print in FIG. 5 for illustration only.

Figure 5:
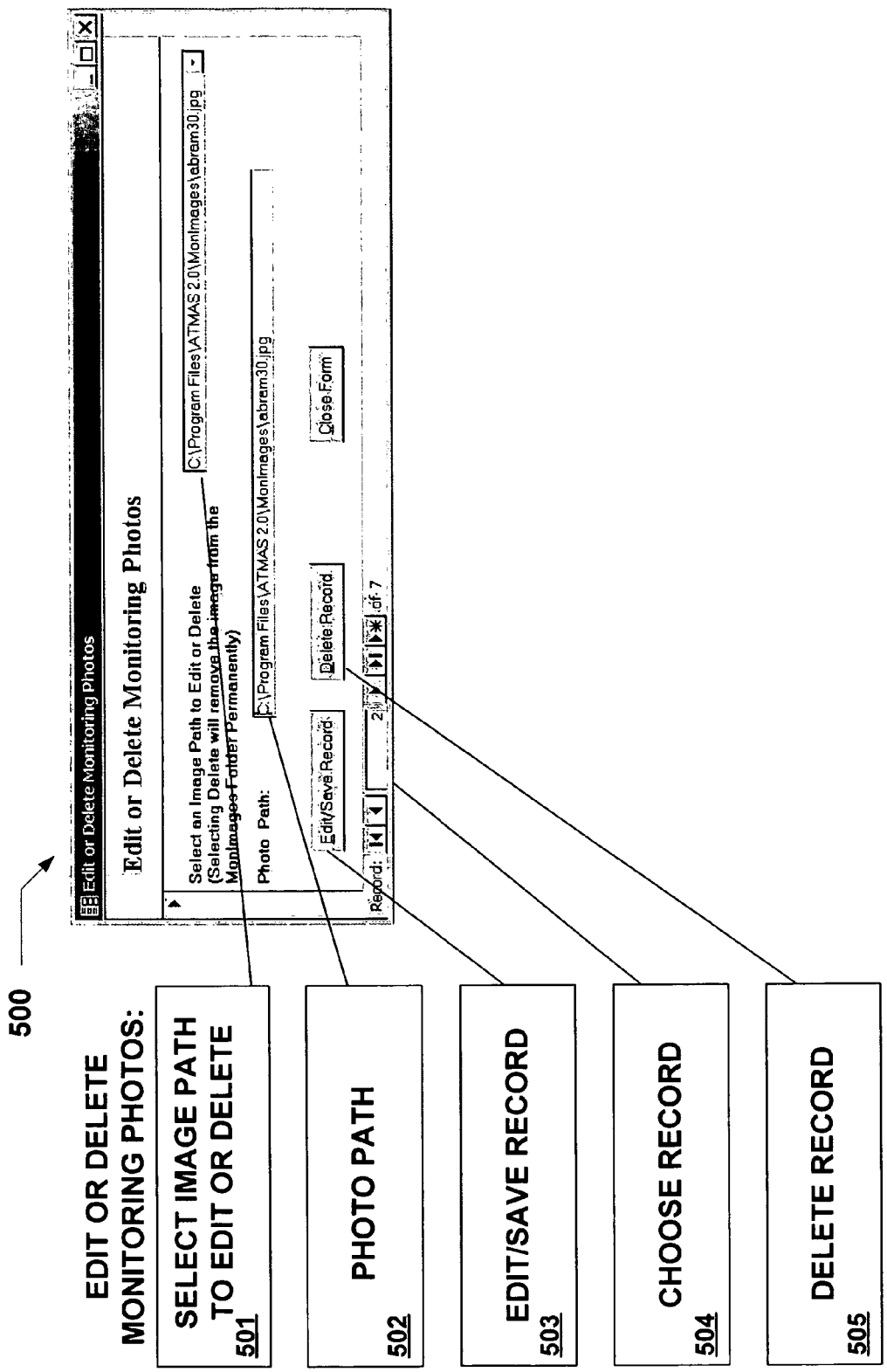
FIG. 5 depicts a screen print and expanded illustration of an available screen on a display of a computer when software incorporated in an embodiment of the present invention is employed to edit or delete monitoring photos.

Refer to FIG. 5. In select embodiments of the present invention, to activate the Edit or Delete Monitoring Photo (photo edit) screen 500, select the image path 501 to the photo you want to delete or edit from the list box with the "Drop Down" arrow. Once a Photo Path 502 is selected the photo edit screen 500 will activate allowing access to the Choose Record button 504, the Edit/Save Record button 503 and the Delete Record button 505. To dissociate a photo and remove it permanently, click the Delete Record button 505 after selecting the record. To change the name of the photo, edit the name in the Photo Path list box 502 and click the Edit/Save button 503.

Figure 6:
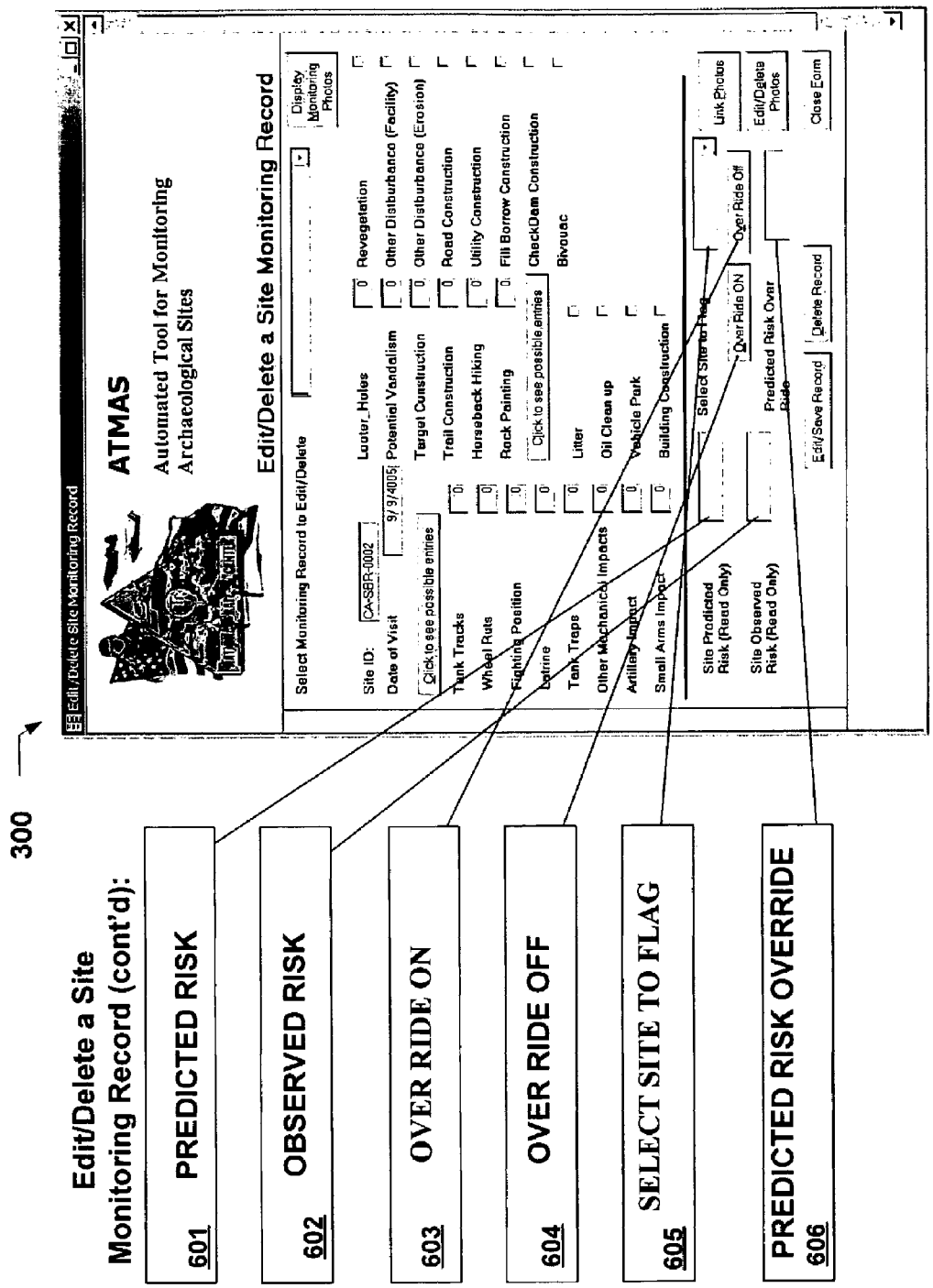
FIG. 6 depicts the screen print of FIG. 3, particularly expanding how an embodiment of the present invention may manipulate Predicted and Observed Risk estimates.

Refer to FIG. 6. In select embodiments of the present invention, the Predicted Risk 601 and Observed Risk 602 values of a CR site are displayed in the lower left corner of the Edit (Data Edit) screen 300, depicted in FIG. 6 as a screen print of the screen for illustration only. In select embodiments of the present invention, initial values for Predicted Risk 601 are based on those specified for each Management Area in the ICRMP, e.g., for Fort Irwin, from the August 2001 Table 4-13. No estimate of Observed Risk 602 is entered until a monitoring record has been initiated. When an installation initiates ATMAS™, CR sites are prioritized based on Predicted Risk 601 and Information Content, as opposed to Information Potential. In select embodiments of the present invention, incorporating Observed Risk 602 in the prioritization process is recommended only after a suitable monitoring period, e.g., in some cases, at least one year. Occasionally, it is desirable to "override" Predicted Risk 601 using the OVER RIDE ON button 603. This may occur, for example, if a CR manager estimates the CR site to be of significant importance or the CR site is at greater risk than indicated by available information. As an example, it may be desirable to frequently monitor a CR site located near an area of localized but intense adverse impacts. To flag a CR site and override a "normal" value of Predicted Risk 601, select the ID number of the CR site from the SELECT SITE TO FLAG drop down list box 605. Selecting (clicking) the OVER RIDE ON button 603 enters a high value of Predicted Risk 601, such as 99, in the PREDICTED RISK OVERRIDE box 606. This ensures that this CR site is assigned to the highest priority group. Later, as more information becomes available to make a better estimate, to reset the site back to a "measured" risk status, again select the site from the SELECT SITE TO FLAG drop down list box 605 and click the OVERRIDE OFF button 604 to reverse the override. When all corrections have been made, click on the EDIT/SAVE RECORD button 503 (FIG. 5).

Figure 7:
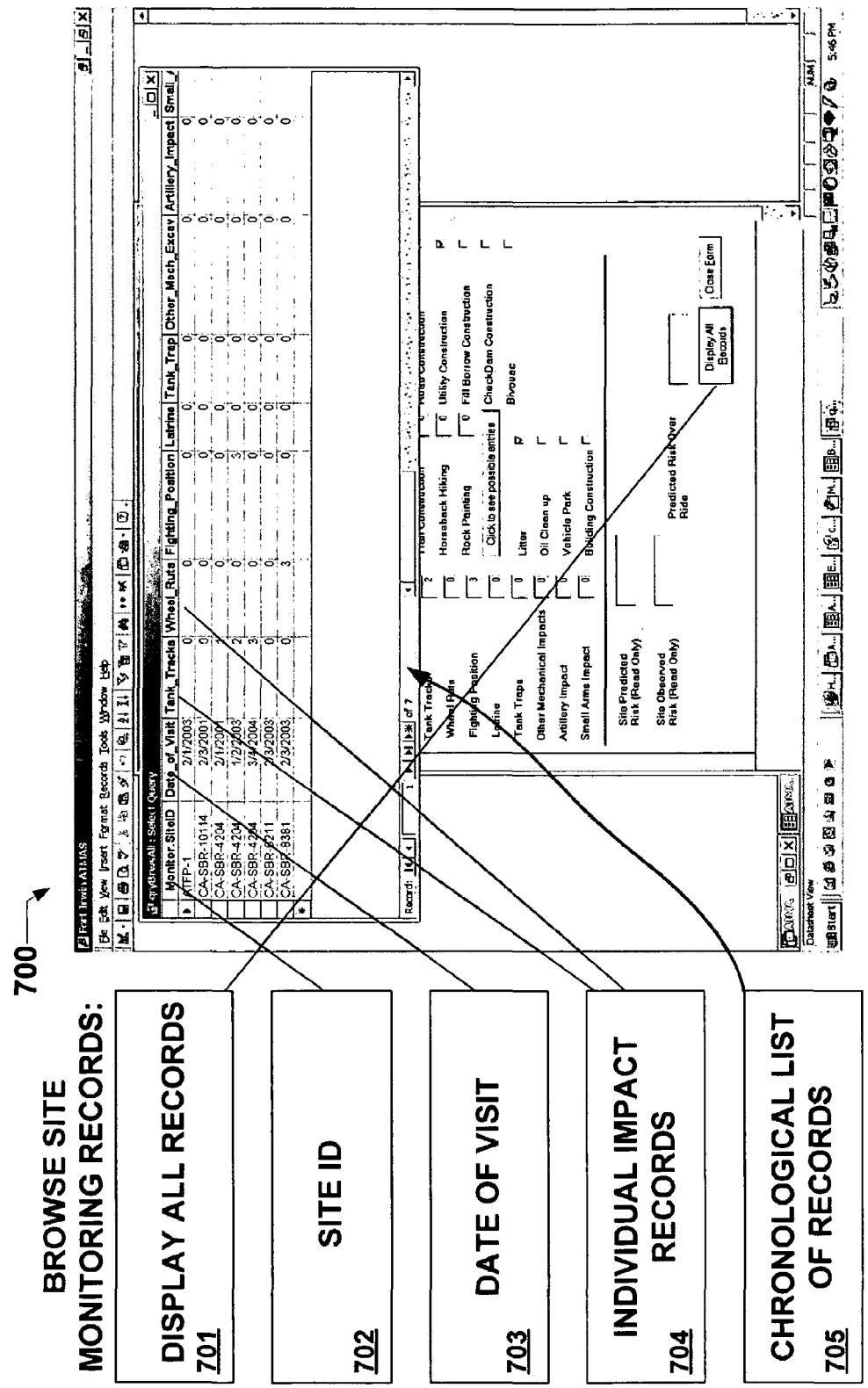
FIG. 7 depicts a pair of screen prints, one screen print overlapping a first screen print initiated from the screen represented by the screen print of FIG. 1, particularly emphasizing the capability of an embodiment of the present invention to display all records.

Refer to FIG. 7. In select embodiments of the present invention, a useful feature of ATMAS™ is the ability to display archived monitoring data as shown in the screen print 700 of FIG. 7 as a top screen 705 opened in a window on top of another screen, the screen print of both screens depicted for illustration only. Data are displayed in chronological order on the top screen 705, allowing a CR manager to track changes in site condition, e.g., an impact increase from tank tracks. All monitoring records are displayed by clicking the BROWSE ALL SITE MONITORING RECORDS button 103 from the ATMAS™ Switchboard 100 (FIG. 1). This displays the BROWSE SITE MONITORING RECORDS screen 700 (bottom screen of FIG. 7).

Clicking the DISPLAY ALL RECORDS button 701 at the bottom of this bottom screen opens a Chronological List of Records (query window) 705 (top screen of FIG. 7) with a list of monitoring records organized by Site ID 702 and Date of Visit 703. Individual Impact Records 704 are available in the columns associated to the right of Site ID 702 and Date of Visit 703.

Figure 8:
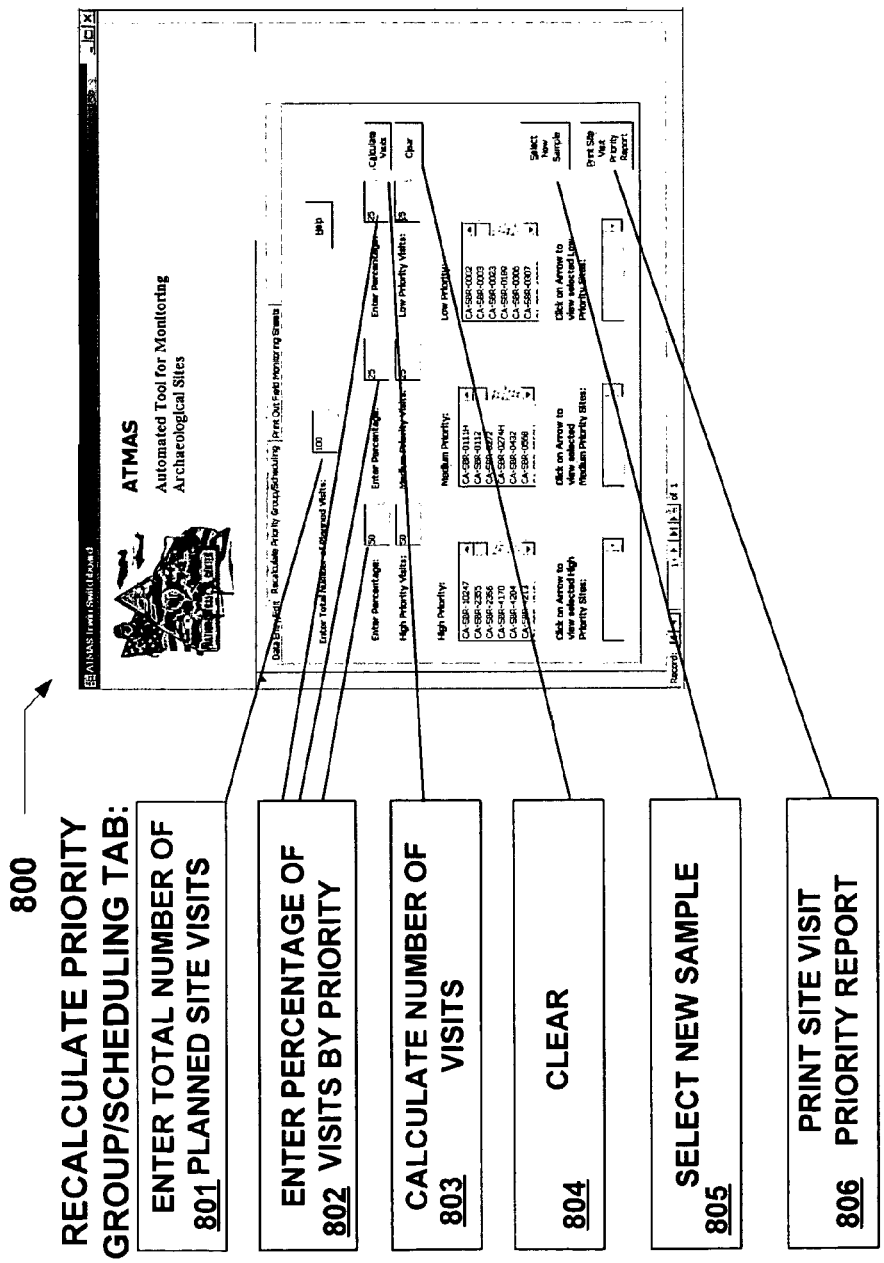
FIG. 8 depicts a screen print of a screen initiated from a second tab of the screen illustrated as a screen print on FIG. 1, particularly emphasizing the capability of an embodiment of the present invention to recalculate priority groups for scheduling.

Refer to FIG. 8. Clicking on the tab labeled Recalculate Priority Group/Scheduling on the ATMAS™ Switchboard 100 (FIG. 1) displays the screen print 800 of a screen entitled Recalculate Priority Group/Scheduling, depicted for illustration purposes only. In the Enter the Total Number of Planned Monitoring Visits box 801, a CR manager enters planned CR site visits for the coming year. In the High, Medium and Low priority boxes 802, the manager enters the percentage of visits to be allocated to each priority category (specific priority group of sites). Clicking on the CALCULATE NUMBER OF VISITS button 803 yields the number of visits to CR sites of each priority. Clicking the SELECT NEW SAMPLE button 805 lists specific CR sites randomly selected from each priority group for monitoring during the monitoring period, e.g., annually. Clicking the PRINT SITE VISIT PRIORITY REPORT button 806 prints a listing of the randomly selected CR sites. In select embodiments of the present invention, this report includes: Management Area, Site ID Number, Grid, UTM Easting, UTM Northing, and Impact boxes to be checked as the CR site is being monitored and a space to add the date of visit completion. This listing may serve as an assignment sheet for personnel tasked with CR site monitoring and provides a visit completion record. These data are entered in the Site Monitoring Records of ATMAS™. Clicking the CLEAR button 804 allows the manager to start over.

Figure 9:
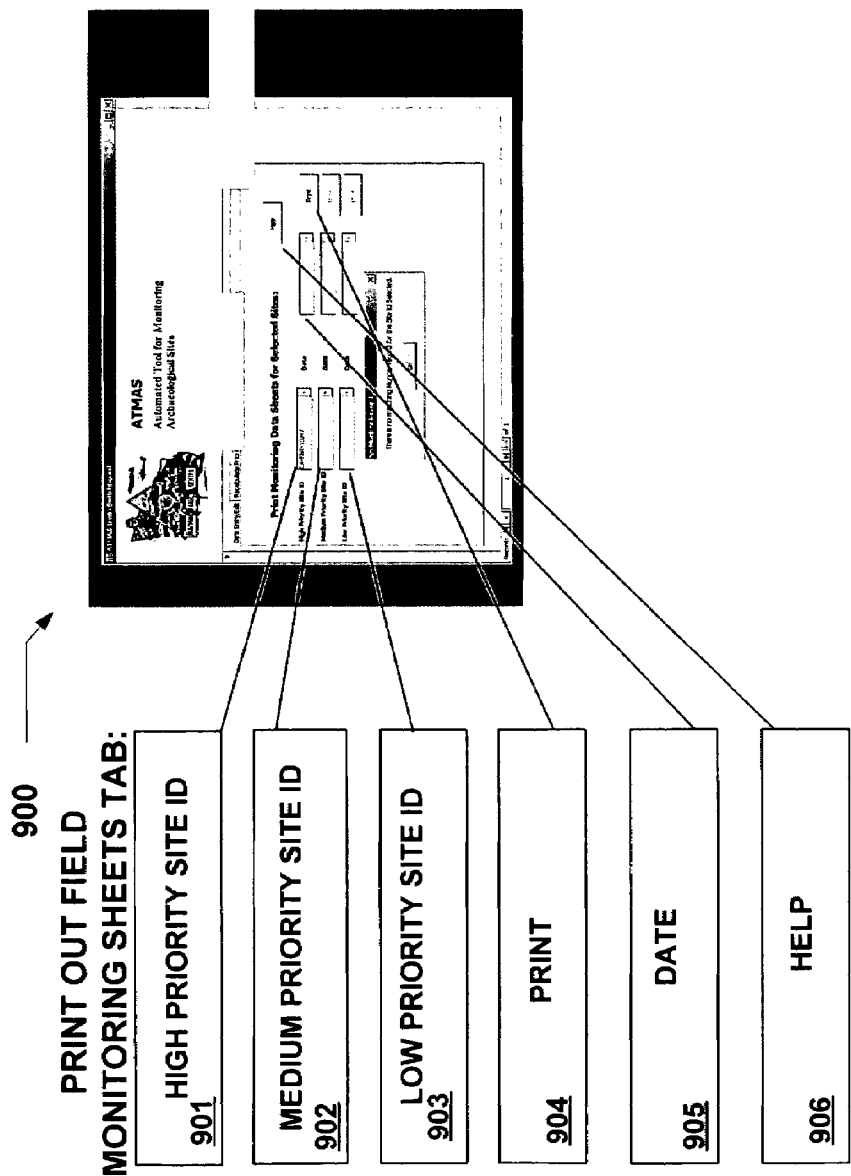
FIG. 9 depicts a screen print of a screen initiated from a third tab of the screen illustrated as a screen print on FIG. 1, particularly emphasizing the capability of an embodiment of the present invention to print out field monitoring sheets.

Refer to FIG. 9. Clicking on the Print-Out Field Monitoring Sheet tab on the ATMAS™ Switchboard 100 (FIG. 1) brings up the screen 900 depicted for illustration purposes as a screen print. From this screen 900, a CR manager may select a CR site from one of the priority lists: High Priority Site ID 901, Medium Priority Site ID 902, and Low Priority Site ID 903. Clicking the PRINT button 904 prints out a data collection form for the selected CR site. If the CR site has never been monitored a message is displayed: There is no matching Monitor record for the Site ID Selected. If a previous monitoring record exists, a CR manager may also print out a recent monitoring record to compare to newly collected data. The CR manager simply selects the date of the monitoring visit from the "Pull Down" list in the appropriate Date box 905 then clicks the PRINT button 904. A HELP button 906 is also available for novice users.

At large installations, such as military bases and ranges, a diverse range of CR Managers input data into ATMAS™. Standardization in defining and quantifying variables is required to detect variation among CR sites and temporal changes in the condition of individual CR sites. In select embodiments of the present invention, experienced CR managers at a given military installation may need to revise or add to operational definitions.

In select embodiments of the present invention, example definitions that apply to military ranges may include:

Recording Level of Impact as:
N=None, enter numerical value of 0
L=Low, enter numerical value of 1
M=Moderate, enter numerical value of 2
H=High, enter numerical value of 3

Tank Tracks: Do not record unless they are clearly discernable, i.e., no "possible" tracks should be recorded. Levels include:
N=None visible
L=Low level of impact, i.e., a few isolated tracks are present.
M=Moderate level of impact, i.e., tracks cover less than one-third of the surface of a CR site.
H=High level of impact; i.e., tracks are numerous, run in various directions, and/or could not be counted easily. Tracks cover more than one-third of the site surface.

Wheel Ruts: Should not be recorded unless they are clearly discernable. No "possible" ruts should be recorded. Levels include:
N=None visible
L=Low level of impact, i.e., a few isolated ruts are present.
M=Moderate level of impact, i.e., ruts cover less than one-third of the surface of a CR site.
H=High level of impact, i.e., ruts are numerous, run in various directions, and could not be counted easily. Ruts cover more than one-third of the site surface.

Fighting position: Excavations large enough for at least one soldier (typically 90 cm long, 60 cm wide, and 75 cm deep). Larger excavations (two man fighting positions) can be recorded in the same category. Both open and filled excavations should be recorded.
N=None visible
L=Low level of impact, i.e., only one or two fighting positions are visible.
M=Moderate level of impact, i.e., three to five fighting positions are visible.
H=High level of impact, i.e., more than five fighting positions are visible.

Latrine: A hole or trench excavated for sanitary purposes. Both open and filled excavations should be recorded.
N=None visible
L=Low level of impact, i.e., one or two latrine excavations are visible.
M=Moderate level of impact, i.e., three to five latrine excavations are visible.
H=High level of impact, i.e., more than five latrine excavations are visible.

Tank Traps: Excavations large enough to contain a tank. Both open and filled excavations should be recorded.
N=None visible
L=Low level of impact, i.e., one tank trap is visible.
M=Moderate level of impact, i.e., two tank traps are visible.
H=High level of impact, i.e., more than two tank traps are visible.

Other Mechanical Impact: Ground disturbance related to use of a backhoe, bulldozer, motorcycle, recreational ATV, etc.
N=None visible
L=Low level of impact, i.e., isolated impacts affecting very small areas, e.g., one ATV track across a CR site.
M=Moderate level of impact, i.e., multiple, but isolated, impacts, e.g., multiple ATV tracks, or a small area of backhoe excavation.
H=High level of impact, i.e., ATV tracks are numerous, run in various directions, and/or could not easily be counted or significant impacts from backhoe or bulldozer excavation.

Artillery Impact: Ground disturbance related to the explosion of ordnance. Both open and filled holes should be recorded.
N=None visible
L=Low level of impact, i.e., one or two isolated impacts affecting very small areas.
M=Moderate level of impact, i.e., three to five isolated impacts.
H=High level of impact; more than five impacts affecting a significant portion of the CR site.

Small Arms Impact: Ground disturbance related to impact by small arms, i.e., non-explosive projectiles.
N=None visible
L=Low level of impact, i.e., numerous isolated impacts affecting very small areas.
M=Moderate level of impact, i.e., numerous impacts affecting less than one-third of the area of a CR site.
H=High level of impact, i.e., numerous impacts affecting more than one-third of the area of a CR site.

Looter Holes: Ground disturbance resulting from unauthorized excavations by relic collectors or vandals. Both open and filled holes should be recorded.
N=None visible
L=Low level of impact, i.e., one or two looter holes are visible.
M=Moderate level of impact, i.e., three to five looter holes are visible.
H=High level of impact, i.e., more than five looter holes are visible.

Potential Vandalism: The likelihood of impacts from vandalism. CR sites with numerous artifacts visible on the surface are most vulnerable to vandalism. Visible CR sites located near roads and other infrastructure are also relatively vulnerable.
N=No potential; i.e., used for CR sites with no surface expression.
L=Low potential, i.e., use guidelines referred to, but not specified, in the ICRMP.
M=Moderate potential, i.e., CR sites with some artifacts visible or located within walking distance from roads or infrastructure.
H=High potential, i.e., CR sites with numerous artifacts visible on the surface and CR sites visible from roads and other infrastructure.

Target Construction: Ground disturbance associated with the construction or maintenance of targets.
N=No impacts visible.
L=Low level of impact, i.e., use guidelines referred to, but not specified, in the ICRMP.
M=Moderate level of impact, i.e., construction of temporary target butts designed to be removed.

H=High level of impact, i.e., construction of target butts that may be considered permanent.

Trail Construction: Ground disturbance associated with trails used by draft or riding animals, such as horses.
N=No impacts visible.
L=Low level of impact, i.e., a single linear trail bisects the CR site.
M=Moderate level of impact, i.e., multiple trails bisect the CR site.
H=High level of impact, i.e., numerous trails cross the CR site in several directions.

Horseback Riding: See Trail Construction.

Rock Painting:
N=No impact visible.
L=Low level of impact, i.e., some paint present at the CR site but it does not impact deposits.
M=Moderate level of impact, i.e., some paint is present at the CR site causing minor impact to deposits.
H=High level of impact, i.e., paint is present at the CR site and has significant impact on deposits.

For the following, put a checkmark in the box if Present:

Litter: Disposal of food waste and other in-field littering. Litter is primarily important as an indicator of the presence of individuals who may also collect artifacts or otherwise damage deposits.
Absent: Only isolated occurrences are visible.
Present: Abundant litter.

Petrochemical Cleanup: Impacts including ground disturbance related to the removal or burying of petrochemicals, e.g., oil spills.
Absent: No significant occurrence, i.e., possibly several very minor occurrences.
Present: One substantial occurrence; three or more minor occurrences.

Vehicle Parking:
Absent: Evidence of very infrequent parking, i.e., no significant impacts.
Present: Evidence of frequent parking, i.e., use by multiple vehicles, and/or significant impacts.

Building Construction: Modern construction only.
Absent: No construction.
Present: Any evidence of actual modern construction at the site.

Re-vegetation: Non-native plants.
Absent: No non-native plants.
Present: Non-native plants present.

Other Disturbance (Facility): Any item that does not fit into the above categories, e.g., abandoned temporary structures such as mobile homes, partially completed roadway, and the like.
Absent: No evidence visible.
Present: Any significant disturbance from facility construction or use.

Other Disturbance (Erosion): Significant channeling or cracks in the soil.
Absent: Very minor wind or water erosion, no significant impact to site.
Present: Any significant disturbance from wind or water erosion.

Road Construction: Paved, unpaved, temporary or permanent paving or panels.
Absent: No evidence visible.
Present: Any evidence of actual construction of a road at or immediately adjacent to the CR site.

Utility Construction: electrical, gas, sewage, water or communications
Absent: No evidence visible.
Present: Any evidence for actual construction of facilities such as pipes, ditches, posts, fences, etc.

Fill Borrow Construction: natural or man-made materials
Absent: No evidence visible.
Present: Any evidence for soil disturbance related to soil borrowing or deposition of fill.

Check Dam Construction: modern natural or man-made materials.
Absent: No evidence visible.
Present: Any evidence for the actual construction of check dams.

Bivouac: Man, animal or machine presence.
Absent: No evidence present, i.e., evidence of very infrequent bivouacking by very small groups.
Present: Evidence of frequent bivouacking by small groups or occasional bivouacking by large groups.

The abstract of the disclosure is provided to comply with the rules requiring an abstract that will allow a searcher to quickly ascertain the subject matter of the technical disclosure of any patent issued from this disclosure. 37 CFR § 1.72(b). Any advantages and benefits described may not apply to all embodiments of the invention.

While the invention has been described in terms of some of its embodiments, those skilled in the art will recognize that the invention can be practiced with modifications within the spirit and scope of the appended claims. For example, although the system is described in specific examples for recording results of archaeological investigations, it may apply to any number of applications including military, industrial, commercial, recreation, mining, geophysical exploration, and agriculture. Thus, it is intended that all matter contained in the foregoing description or shown in the accompanying drawings shall be interpreted as illustrative rather than limiting, and the invention should be defined only in accordance with the following claims and their equivalents.

We claim:

1. A method for prioritizing and scheduling monitoring visits to sites to obtain information, comprising:
    defining impact categories for said sites;
    defining measures of intensity for each said impact category;
    establishing guidance for assigning said measures of intensity;
    defining priority levels for said visits;
    calculating estimates of risk for each said site,
wherein at least one first said estimate of risk is established via prediction and at least one second said estimate of risk is established via observation;
    assigning said estimates of risk to each said site;
    implementing a database in software to establish records and manipulate at least one of said impacts, measures, and estimates to assign one said priority level to each said site, each site of a given priority assigned to a unique group;
    installing said database on at least one computer;
    scheduling a sampling from each said group for said visits over a pre-specified interval, wherein said sampling is defined by randomly selecting a pre-defined percentage, said percentage unique to each said group, and wherein said sampling is defined by employing a pre-specified algorithm installed on at least one said computers; and providing said sampling as a list of sites to be visited by at least one site monitor during said pre-specified interval.

2. The method of claim 1 further comprising facilitating management of said information obtained from said site visits.

3. The method of claim 1 said sites comprising cultural resource sites.

4. The method of claim 1 said software comprising at least one commercial-off-the-shelf program.

5. The method of claim 1 further comprising a capability to override at least one said estimate of risk for at least one said site.

6. The method of claim 1 further comprising a capability to override said prediction estimate of risk for at least one said site.

7. The method of claim 1 further providing a capability to edit said records.

8. The method of claim 1 further providing a capability to incorporate photos of said sites.

9. The method of claim 1 further providing a capability to update said records from at least one linked software program.

10. The method of claim 9 said linked software program comprising a cultural resource database.

11. The method of claim 9 said linked software program comprising a photo database.

12. A method for monitoring cultural resource sites to obtain information, comprising:

defining impact categories for said sites;

defining measures of intensity for each said impact category;

establishing guidance for assigning said measures of intensity;

defining priority levels for said sites;

calculating estimates of risk for each said site, wherein at least one first said estimate of risk is established via prediction and at least one second said estimate of risk is established via observation;

assigning said estimates of risk to each said site;

implementing a database in software to establish records and manipulate at least one of said impacts, measures, and estimates to assign one said priority level to each said site, each said site of a given priority assigned to a unique group; and installing said database on at least one computer.

13. The method of claim 12 further scheduling a sampling from each said group of said sites for monitoring visits over a pre-specified interval, wherein said sampling is defined by randomly selecting a pre-defined percentage, said percentage unique to each said group, and wherein said sampling is defined by employing a pre-specified algorithm installed on at least one said computers.

14. The method of claim 13 further providing said sampling as a list of sites to be visited by at least one site monitor during said pre-specified interval.

15. The method of claim 13 further providing a capability to incorporate photos of said sites.

16. The method of claim 12 further comprising facilitating management of information obtained from said site visits.

17. The method of claim 12 said software comprising at least one commercial-off-the-shelf program.

18. The method of claim 12 further comprising a capability to override at least one said estimate of risk for at least one said site.

19. The method of claim 12 further comprising a capability to override said prediction estimate of risk for at least one said site.

20. The method of claim 12 further providing a capability to edit said records.

21. The method of claim 12 further providing a capability to update said records from at least one linked software program.

22. The method of claim 21 said linked software program comprising a cultural resource database.

23. The method of claim 21 said linked software program comprising a photo database.

* * * * *